United States Patent [19]

Schwitters

[11] 4,390,760
[45] Jun. 28, 1983

[54] CONDUCTIVITY TYPE IN-LINE LIQUID SENSING APPARATUS

[75] Inventor: Stephen W. Schwitters, Rockford, Ill.

[73] Assignee: Taylor Freezer Company, Rockton, Ill.

[21] Appl. No.: 340,352

[22] Filed: Jan. 18, 1982

[51] Int. Cl.³ .......................................... H01H 29/00
[52] U.S. Cl. ............................ 200/61.04; 200/61.05
[58] Field of Search .............. 200/61.04, 61.05, 61.06, 200/61.07

[56] References Cited

U.S. PATENT DOCUMENTS

| | | | |
|---|---|---|---|
| 2,839,742 | 6/1958 | Sumner | 200/61.05 X |
| 3,316,368 | 4/1967 | Veau | 200/61.04 |
| 3,499,130 | 3/1970 | Norred | 200/61.04 |
| 4,305,420 | 12/1981 | Nussdorf | 200/61.04 X |

Primary Examiner—J. R. Scott
Attorney, Agent, or Firm—Vernon J. Pillote

[57] ABSTRACT

A conductivity type in-line liquid sensing apparatus adapted for connection in a liquid supply line to sense interruption of the liquid supply in the line. The sensing apparatus includes a trap chamber having a liquid inlet tube and a liquid outlet tube and the outlet tube forms one electrode of an electrode pair. The outlet tube electrode has a gas vent opening at a level above the lower end of the other electrode of the electrode pair, to vent gas from the trap chamber and maintain the liquid level in the chamber above the lower ends of the electrodes, until the liquid supply is interrupted. A sensing circuit is connected to the electrode pair to apply a low voltage to the electrodes and cause a low current to pass between the electrodes when they are bridged by liquid in the trap chamber. The sensing circuit is arranged to actuate an output device in response to the change in conductivity that occurs when the liquid supply is interrupted and does not form a conductive bridge between the electrodes.

6 Claims, 3 Drawing Figures

CONDUCTIVITY TYPE IN-LINE LIQUID SENSING APPARATUS

BACKGROUND OF THE INVENTION

The present invention relates to an in-line sensing apparatus for sensing interruption of the liquid supply in a line and particularly to a conductivity type in-line liquid sensing apparatus. The prior conductivity type in-line liquid sensing apparatus with which the applicant is familiar utilized a tube of electrically nonconductive material that was connected by electrically conductive end fittings in the liquid supply line to have the liquid flow therethrough with the tube arranged to extend generally horizontally. A low voltage was applied to the end fittings and interruption of liquid supply in the line was sensed by sensing a change in conductivity between the end fittings. However, problems were encountered with occasional bubbles of gas in the liquid which would produce a change in conductivity between the end fittings and cause the sensing apparatus to give a false indication that the liquid supply was interrupted. The addition of an electrically conductive probe that extended from one end fitting into the nonconductive tube and terminated in spaced relation to the other end fitting, did not solve the problem encountered with air bubbles.

SUMMARY OF THE INVENTION

It is the object of this invention to provide a conductivity type in-line liquid sensing apparatus which can accommodate gas bubbles in the liquid in the supply line without producing a false indication that the liquid supply is interrupted.

Another object of this invention is to provide a conductivity type in-line liquid sensing apparatus which is operative to purge excess gas from the sensing apparatus and prevent accumulation of gas in the sensing apparatus.

Accordingly, the present invention provides a conductivity type in-line liquid sensing apparatus for insertion in a liquid supply line to sense interruption of liquid supply in the line, and which sensing apparatus includes a container having an inlet and an outlet adapted for connection in the liquid supply line to have the liquid from the line pass through the container, the container being formed of an electrically insulative material and defining a closed trap chamber having a top and a bottom, the liquid including an outlet tube electrode of electrically conductive material extending downwardly in the chamber and terminating with its lower end at a preselected level below the top and above the bottom of the chamber, a second electrode extending downwardly in the chamber and terminating with its lower end at a level above the lower end of the outlet tube electrode, a gas vent opening in the outlet tube electrode at a level above the lower end of the second electrode and below the top of the chamber, the gas vent opening having a size that is small as compared to the internal size of the outlet tube electrode and operative to pass gaseous fluids therethrough from the chamber to the outlet while substantially impeding flow of liquid therethrough to the outlet, and electrical conductivity sensing means connected to the outlet tube electrode and to the second electrode for sensing the conductivity therebetween.

BRIEF DESCRIPTION OF THE DRAWINGS

These, together with other objects, features and advantages of this invention will become apparent from the following description in conjunction with the attached drawings wherein.

DESCRIPTION OF THE PREFERRED EMBODIMENT

Figure 1:
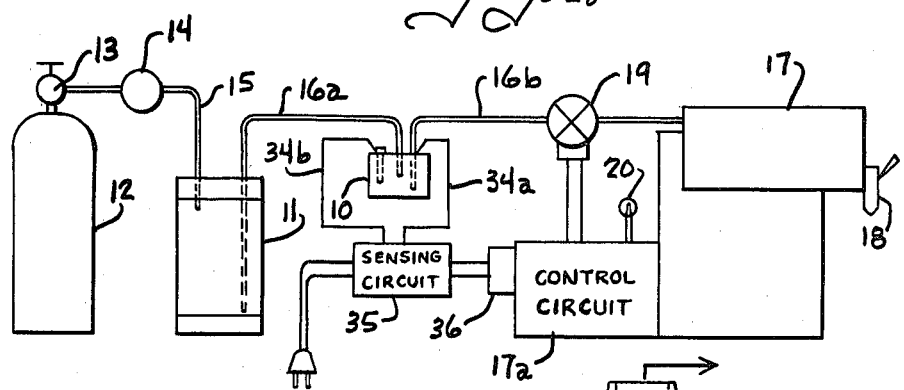
FIG. 1 is a diagrammatic illustration of a beverage dispensing machine embodying the conductivity type in-line liquid sensing apparatus.

The in-line liquid sensing apparatus is adapted for connection in series with a liquid supply line to have liquid from the supply line flow therethrough and to sense the interruption of the liquid supply in the line. The in-line liquid sensing apparatus can be utilized to actuate a signal such as a light or to actuate some control for a machine or apparatus associated with the supply line. For example, the in-line conductivity sensing apparatus 10 can be used to sense an interruption of the liquid supply in a beverage dispensing apparatus, as diagrammatically shown in FIG. 1. As shown in that drawing, a liquid, such as a flavoring syrup or a pre-mix beverage, is contained in a tank 11. Gas under pressure from a gas tank 12 is supplied through a valve 13 and a regulator 14 through a gas supply line 15 leading to the top of the tank 11. The gas pressure in the tank forces the liquid up through a liquid supply line 16a to the conductivity sensing apparatus 10 and liquid from the conductivity sensing apparatus flows out through supply line 16b to a dispensing apparatus 17 having an outlet dispensing valve 18. In some liquid supply systems it is sufficient to actuate an indicator such as a light to indicate when the liquid supply is interrupted. However, in some systems, such as beverage dispensing apparatus, it is important to also operate controls to shut down or otherwise modify the operation of the dispensing apparatus. In the embodiment diagrammatically shown in FIG. 1, the in-line liquid sensing apparatus is arranged to operate controls in the control circuit 17a for the dispensing apparatus 17 which are operative to shut down the dispensing apparatus, close a valve 19 in the liquid supply line 16b and operate an indicator such as a light 20, when the liquid sensing apparatus senses an interruption in the liquid supply.

Figure 3:
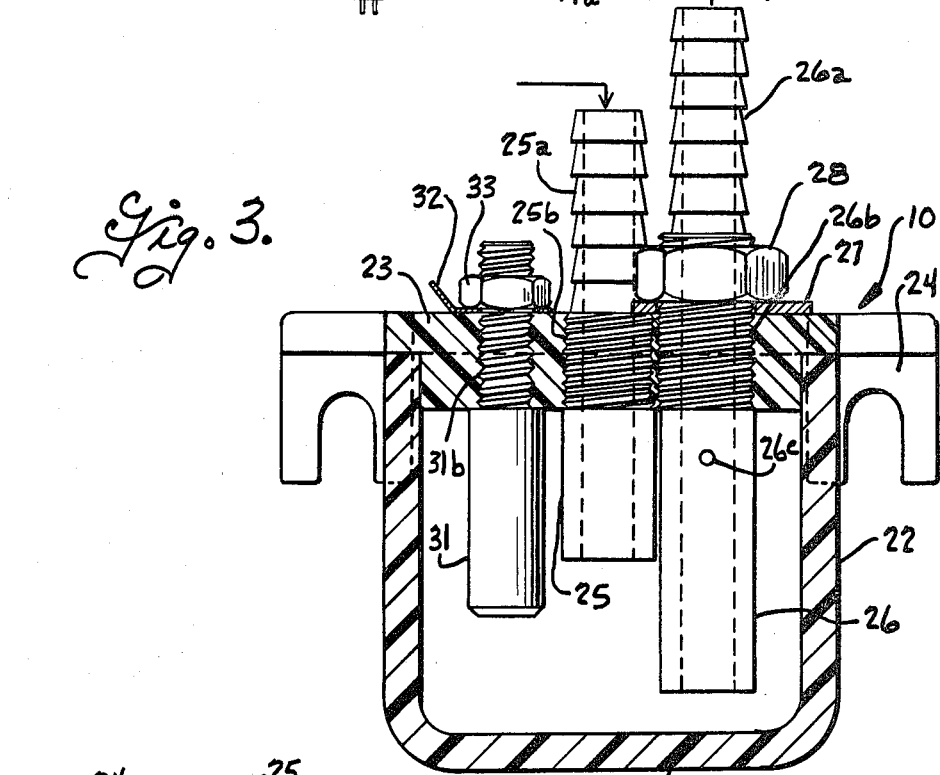
FIG. 3 is a vertical sectional view through the in-line liquid sensing apparatus taken on the plane 3—3 of FIG. 2 and illustrating parts on a larger scale than FIG. 2.
Figure 2:
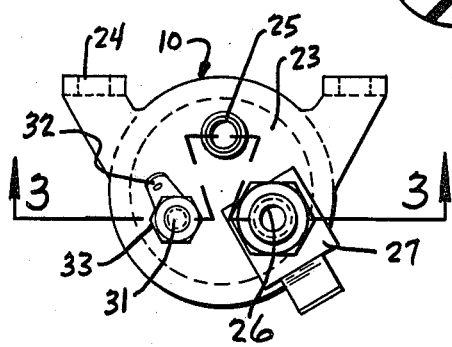
FIG. 2 is a top plan view of the in-line liquid sensing apparatus.

The in-line liquid sensing apparatus comprises a container which defines a closed trap chamber. As shown in FIGS. 2 and 3, the container includes a bottom wall 21, and upstanding side walls 22 and a top wall 23. The container is formed of an electrically insulative material such as plastic or the like, and the container is provided with a means such as mounting lugs 24 for mounting the container on a fixed support with the top wall 23 of the container uppermost. The top wall 23 is sealed to the side walls of the container to form a closed trap chamber and may, for example, be bonded by a suitable adhesive or solvent to the side walls of the container.

The sensing apparatus has a liquid inlet tube 25 that extends through the top wall 23 and downwardly into the trap chamber. The outer end of the tube has a fitting portion 25a adapted for connection to the liquid supply line 16a to receive liquid therefrom. The tube 25 is secured to and sealed to the top wall 23 and, as shown, is provided with external threads 25b tapped into an opening in the top wall. Any other suitable means can be provided for mounting and sealing the inlet tube 25 in the top wall 23.

The sensing apparatus also includes an outlet tube 26 which extends through an opening in the top wall 23 and which has an external fitting portion 26a adapted for connection to the liquid supply line 16b. The outlet tube 26 is also mounted on the top wall 23 in sealed relation therewith and, as shown, is provided with an externally threaded portion 26b that is tapped into an opening in the top wall 23. The outlet tube 26 is also used as an electrode and is formed of an electrically conductive material to provide a combination outlet tube and electrode. The outlet tube electrode is connected to an electrical connector terminal 27 as by a nut 28 that is threaded on the portion 26b of the outlet tube electrode. The outlet tube electrode 26 extends downwardly into the trap chamber and terminates with its lower end at a preselected level below the top and above the bottom of the chamber. The inlet and outlet tubes 25 and 26 preferably have an internal size at their lower ends that is sufficiently small to substantially prevent air bubbles from rising in the tubes and allowing liquid to drain out of the tubes into the trap chamber after the liquid level drops below the ends of the tube. For example, with many syrups used in beverage dispensing apparatus, an internal diameter of 5/32 inches has been found satisfactory, it being understood that the desired internal size of the inlet and outlet tubes will vary with the liquid viscosity and that larger tubes can be used with more viscous liquids.

A second electrode 31 is mounted on the top wall 23 and extends downwardly in the trap chamber and terminates with its lower end at a level above the lower end of the outlet tube electrode. The second electrode 31 is formed of an electrically conductive material and, as shown in FIG. 3, has a threaded portion 31b tapped an opening in the top wall 23 to seal the interface between the second electrode and the top wall, and an electrical connector terminal 32 is attached to the external end portion of the electrode as by a nut 33.

A gas vent or bleed opening 26c is provided in the outlet tube electrode at a level above the lower end of the second electrode 31. The gas vent opening has a size that is small as compared to the internal size of the outlet tube electrode and the vent opening is made sufficiently small to pass gaseous fluids therethrough from the trap chamber to the outlet while substantially impeding the flow of liquid therethrough. The gas vent opening may, for example, have a size of the order of 1/64th to 1/32 inches. The gas vent opening is thus operative to vent gaseous fluid from the trap chamber to the outlet until the liquid level in the trap chamber rises to a level above the vent opening. In this manner, the conductivity sensing apparatus is operative to automatically purge gas from the chamber during start-up and also to purge gas bubbles that enter the chamber during operation. The gas vent opening is preferably spaced below the underside of the top wall 23 a distance sufficient to prevent the liquid in the trap chamber from contacting the underside of the top wall where it could form a conductive bridge between the outlet tube electrode 26 and the second electrode 31. The lower end of the second electrode 31 is preferably disposed at a level sufficiently above the lower end of the outlet tube electrode 26 to substantially prevent liquid dripping off the second electrode from forming a conductive bridge between the lower end of the second electrode and the liquid, when the surface of the liquid in the chamber is at the level of the lower end of the outlet tube electrode. The lower end of the inlet tube 25 preferably terminates at a level below the level of the vent opening 26c in the outlet tube electrode, and above the lower end of the second electrode 31, to deliver the incoming liquid to the trap chamber below the liquid level during normal operations, to thereby reduce entrainment of gas from the gas head space in the trap chamber, as the liquid enters the trap chamber.

The outlet tube electrode 26 and the second electrode 31 are connected by electrical conductors 34a and 34b to a sensing circuit 35 which is operative to supply a relatively low voltage, for example of the order of 6 to 12 volts to the electrodes, and which causes a low current to pass between the electrodes when the electrodes are bridged by a conducting liquid. The sensing circuit is arranged to operate an output device such as a relay 36 to a first condition, when the liquid in the trap chamber forms a conductive bridge between the electrodes and to operate the output device or relay 36 to a second condition in response to the decrease in conductivity that occurs when the liquid in the trap chamber falls below the level of the second electrode 31 and no longer forms a conductive bridge between the electrodes 31 and 26. The sensing circuit is of a type commonly used in electrode probe type liquid level sensing apparatus and detailed description of the sensing circuit is accordingly deemed unnecessary. In the beverage dispensing apparatus shown in FIG. 1, the relay 36 is utilized to operate controls in the control circuit 17a of the beverage dispensing apparatus which are operative, when the relay 36 is actuated to its second condition, to shut down the dispensing apparatus 17, close a valve 19 in the liquid supply line 16b, and actuate an indicator such as a light 20.

From the foregoing it is thought that the construction and operation of the in-line liquid sensing apparatus will be readily understood. The in-line liquid sensing apparatus is connected in series with the liquid supply line so that the liquid flowing through the supply line enters the trap chamber through inlet tube 25 and passes out of the trap chamber through outlet tube electrode 26. The vent opening 26c in the outlet tube electrode normally passes gas from the upper portion of the chamber to the outlet so that the liquid level in the trap chamber is adjacent the top of the vent opening during normal operation. If a bubble or bubbles of gas enter the trap chamber with the liquid from the supply line 16a, the vent opening 26c will function to purge or vent the gas from the chamber and prevent the gas from accumulating in the chamber, as long as the liquid supply to the sensing apparatus is substantially continuous. When the liquid supply is interrupted, the liquid in the chamber continues to flow through the outlet tube electrode 26 until the liquid level reaches the lower end of the outlet tube electrode. When the liquid level drops below the lower end of the second electrode 31, it no longer forms a conductive bridge between the electrodes 31 and 26 and the sensing circuit senses the change of conductivity and actuates the output device or relay 36 to its second condition. As described, the electrode 31 has its lower end spaced above the lower end of the outlet tube electrode 26 a distance such that liquid dripping off the electrode 31 cannot form a conductive bridge with the liquid in the container, when the surface of the liquid is at the level of the lower end of the outlet tube electrode. This effectively prevents the sensing device 10 from producing a false indication that the liquid supply is reestablished.

The embodiments of the invention in which an exclusive property or privilege is claimed are defined as follows:

1. A conductivity type in-line liquid sensing apparatus for insertion in a liquid supply line to sense interruption of the liquid supply in the line, the sensing apparatus comprising a container having an inlet and an outlet adapted for connection in a liquid supply line in series therewith to have the liquid from the line pass through the container, the container being formed of an electrically insulative material and defining a closed trap chamber having a top and bottom, the liquid outlet including an outlet tube electrode of electrically conductive material extending downwardly in the chamber and terminating with its lower end at a preselected level below the top and above the bottom of the chamber, a second electrode extending downwardly in the chamber and terminating with its lower end at a level above the lower end of the outlet tube electrode, a gas vent opening in the outlet tube electrode at a level above the lower end of the second electrode and below the top of the chamber, the gas vent opening having a size that is small as compared to the internal size of the outlet tube electrode and operative to pass gaseous fluids therethrough from the chamber to one outlet while substantially impeding flow of liquid therethrough to the outlet, and electrical conductivity sensing means connected to said outlet tube electrode and said second electrode for sensing the conductivity therebetween.

2. A conductivity type in-line liquid sensing apparatus according to claim 1 wherein said gas vent opening in the outlet tube electrode is spaced below the top of the chamber to maintain a gas space between the liquid and the top of the chamber.

3. A conductivity type in-line liquid sensing apparatus according to claim 1 wherein the lower end of the second electrode is spaced above the lower end of the outlet tube electrode a distance sufficient to substantially prevent liquid dripping off the second electrode from forming a conductive bridge between the lower end of second electrode and the liquid when the surface of the liquid in the chamber is at the level of the lower end of the outlet tube electrode.

4. A conductivity type in-line liquid sensing apparatus according to claim 3 wherein the inlet passage comprises an inlet tube extending downwardly in the chamber and having its lower end at a level below said gas vent opening and above the lower end of said second electrode.

5. A conductivity type in-line liquid sensing apparatus according to claim 1 wherein the inlet passage comprises an inlet tube extending downwardly in the chamber and having its lower end at a level below said gas vent opening and above the lower end of said second electrode.

6. A conductivity type in-line liquid sensing apparatus according to claim 1 wherein the internal size of the inlet tube and the outlet tube openings are sufficiently small to substantially prevent air bubbles from rising in the tubes.

* * * * *